US010617135B2

(12) United States Patent
Joergensen et al.

(10) Patent No.: US 10,617,135 B2
(45) Date of Patent: Apr. 14, 2020

(54) PROCESS FOR MANUFACTURING A FEED COMPOSITION

(71) Applicants:Novozymes A/S, Bagsvaerd (DK); DSM IP Assets B.V., Heerlen (NL)

(72) Inventors: Christel Thea Joergensen, Bagsvaerd (DK); Anders Viksoe-Nielsen, Bagsvaerd (DK); Dan Pettersson, Bagsvaerd (DK)

(73) Assignees: Novozymes A/S, Bagsvaerd (DK); DSM IP Assets B.V., Heerlen (NL)

( * ) Notice: Subject to any disclaimer, the term of this patent is extended or adjusted under 35 U.S.C. 154(b) by 0 days.

(21) Appl. No.: 14/900,765

(22) PCT Filed: Jun. 24, 2014

(86) PCT No.: PCT/EP2014/063229
§ 371 (c)(1),
(2) Date: Dec. 22, 2015

(87) PCT Pub. No.: WO2014/206960
PCT Pub. Date: Dec. 31, 2014

(65) Prior Publication Data
US 2016/0150808 A1 Jun. 2, 2016

(30) Foreign Application Priority Data
Jun. 26, 2013 (EP) .................................... 13173761

(51) Int. Cl.
| A23K 30/00 | (2016.01) |
| A23K 20/163 | (2016.01) |
| A23K 40/25 | (2016.01) |
| A23K 40/20 | (2016.01) |
| A23K 10/14 | (2016.01) |
| A23K 20/189 | (2016.01) |

(52) U.S. Cl.
CPC ............ *A23K 20/163* (2016.05); *A23K 10/14* (2016.05); *A23K 20/189* (2016.05); *A23K 40/20* (2016.05); *A23K 40/25* (2016.05)

(58) Field of Classification Search
CPC ..... A23K 1/1656; A23K 1/1643; A23K 1/003
USPC ........................................ 426/50, 52, 53, 54
See application file for complete search history.

(56) References Cited

U.S. PATENT DOCUMENTS

| 4,393,085 A | 7/1983 | Spardlin | |
| 2004/0076715 A1* | 4/2004 | Parthasarathy | ........ A23K 40/20 426/18 |
| 2007/0104794 A1* | 5/2007 | Marcussen | ............ A23K 40/10 424/489 |
| 2009/0297664 A1 | 12/2009 | Forte et al. | |
| 2012/0093976 A1 | 4/2012 | Marcussen | |
| 2014/0370169 A1* | 12/2014 | De Cock | .................. A23G 4/10 426/285 |

FOREIGN PATENT DOCUMENTS

| EP | 2103224 A1 | 9/2009 | |
| GB | 2 134 767 | * 8/1984 | ............... A23K 1/14 |
| GB | 2134767 A | 8/1984 | |
| WO | 03/059087 A1 | 7/2003 | |
| WO | 2004/034812 A1 | 4/2004 | |
| WO | 2006/034710 A1 | 4/2006 | |
| WO | 2007/044968 A2 | 4/2007 | |
| WO | 2013/119468 A2 | 8/2013 | |

OTHER PUBLICATIONS

Troche et al., Poultry Science, vol. 86, pp. 496-502 (2007).
Anonymous, Google dictionary of "kibble" (2018).
Carciofi et al., Animal Feed Science and Technology, vol. 177, pp. 211-217 (2012).
Danisco, Product description—Avizyme 1502 (2002).
Froetschner, Feed Tech, pp. 15-25 (Oct. 10, 2006).
Gehring et al., J. Appl. Poult. Res., vol. 20, pp. 75-89 (2011).
Gray et al., Journal of Bacteriology, vol. 166, pp. 635-643 (1986).
Heimann, The Pelleting Process, pp. 1-39 (2013).
Hilton et al., Aquaculture, vol. 25, pp. 185-194 (1981).
Wood, Animal Feed Science and Technology, vol. 18, pp. 1-17 (1987).
Bahnasawy et al., Misr. J. Ag. Eng., vol. 28, No. 4, pp. 947-960 (2011).
Elsey et al., Computers Chemical Engineering, vol. 21, Suppl., pp. S361-S366 (1997).
Skoch et al., Animal Feed Science and Technology, vol. 6, pp. 83-90 (1981).

* cited by examiner

*Primary Examiner* — Hamid R Badr
(74) *Attorney, Agent, or Firm* — Elias Lambiris

(57) ABSTRACT

In the steam pelleting of feed components which include starch, the addition of an alpha-amylase to the raw material meal can reduce energy consumption (energy input) in the feed press, and increase the throughput (capacity per hour), and it may be possible to reduce the temperature in the pellet press.

17 Claims, No Drawings

PROCESS FOR MANUFACTURING A FEED COMPOSITION

CROSS-REFERENCE TO RELATED APPLICATIONS

This application is a 35 U.S.C. 371 national application of PCT/EP2014/063229 filed Jun. 24, 2014, which claims priority or the benefit under 35 U.S.C. 119 of European application no. 13173761.1 filed Jun. 26, 2013, the contents of which are fully incorporated herein by reference.

FIELD OF THE INVENTION

The present invention relates to a process for manufacturing a feed composition.

BACKGROUND OF THE INVENTION

Many animal feeds are prepared in the form of pellets. The production of feed pellets involves subjecting the feed to moist heat, followed by mechanical pressing.

Steam pelleting (a.k.a. steam pelletizing) involves mixing feed components generally having a high content of starch, steam conditioning the mixture, and mechanically pressing to form pellets in a die press. In steam pelleting, the feed mixture after steam treatment generally has a fairly low water content, resulting in little or no gelatinization of starch in the feed mixture during the pellet pressing. In contrast, an alternative process of feed preparation involves extrusion cooking where the water content is generally higher and the starch in the feed tends to gelatinize to a high degree. The feed components generally have a high content of starch, and the pelleting is generally done at lower moisture than the alternative process of extrusion. The pressing of pellets involves considerable energy consumption, and it is of interest to reduce this energy consumption.

US 2009/0297664 A1 discloses a method for low temperature forming of starch based and/or protein based feeds. US 2004/0076715 A1 discloses a method of making a dry pet food product.

SUMMARY OF THE INVENTION

The inventors have found that in the steam pelleting of feed components which include starch, the addition of an alpha-amylase to the feed components can reduce energy consumption (energy input) in the feed press, and increase the throughput (capacity per hour), and it may be possible to reduce the temperature in the pellet press.

Accordingly, the invention provides a process for manufacturing a pelleted feed composition comprising the steps of:

a) mixing feed components comprising starch with an alpha-amylase,
b) steam treating the mixture (a) to obtain a moisture content below 20% by weight of the mixture, and
c) pressing the steam treated mixture (b) to form pellets, at conditions so as to reduce energy consumption in step (c) compared to a process without the alpha-amylase.

DETAILED DESCRIPTION OF THE INVENTION

Feed Components

The feed components used in the invention include starch. The starch-containing feed components typically include vegetable material such as cereal(s), e.g., one or more of corn (maize), wheat, barley, rye, rice, sorghum and millet, and/or tubers such as potatoes, cassava and sweet potato. The vegetable material may be milled, e.g., wet or dry milled grain, or distillers dry grain solids (DDGS).

The feed components typically contain 20-80% w/w of starch.

The feed components may also contain protein-rich feed ingredients such as soybean (preferably soybean meal), rapeseed, palm kernel, cotton seed and sunflower. The feed components may further include commonly used ingredients such as vitamins and minerals.

Alpha-amylase

The feed components are mixed with an alpha-amylase. The alpha-amylase should be incorporated in a form that allows good contact with the starch. It may be in liquid or powder form, e.g. a freeze-dried or spray-dried powder.

The alpha-amylase is an enzyme classified under EC 3.2.1.1. The alpha-amylase may be bacterial or fungal. A bacterial alpha-amylase used according to the invention may, e.g., be derived from a strain of the genus *Bacillus*, which is sometimes also referred to as the genus *Geobacillus*. In an embodiment the *Bacillus* alpha-amylase is derived from a strain of *B. amyloliquefaciens, B. licheniformis, B. stearothermophilus, B. halmapalus,* or *B. subtilis*, but may also be derived from other *Bacillus* sp.

The alpha-amylase preferably has a melting point above 75° C., particularly above 80° C., above 85° C. or above 90° C. The melting point may be determined by thermal shift assay (TSA), e.g. as described in the examples.

Commercially available alpha-amylases useful in the invention include Stainzyme; Stainzyme Plus; Duramyl™, Termamyl™, Termamyl Ultra; Natalase, Maltogenase, Fungamyl™, Liquozyme™, Liquozyme SC, Termamyl SC and BAN™ (Novozymes NS), Rapidase™ and Purastar™ (from Genencor International Inc.).

Suitable alpha-amylases are also described in WO 1996/023873, WO 1996/023874, WO 97/41213, WO 1999/019467, WO 2000/060059, WO 2002/010355, WO 2011/082425.

The alpha-amylase may be included in the mixture (a) in an amount of at least 2 g enzyme protein per ton of feed component, particularly at least 5 g/t, e.g. 2-100 g/t or 5-40 g/t. It may be added in an amount to provide an alpha-amylase activity of 54,000-960,000 KNU per ton of feed component. KNU is an alpha-amylase activity unit; 1 KNU is defined as the amount of enzyme which dextrinizes 5.26 g per hour of starch dry substance at standard conditions: 37° C.; starch concentration 4.63 mg/mL; 0.0003 M $Ca^{2+}$; pH 5.6.

Process for Manufacturing Feed Pellets

Steam Conditioning

The manufacture of the feed pellets involves steam treatment prior to pelleting, a process called conditioning. In the subsequent pelleting step the feed is forced through a die and the resulting strands are cut into suitable pellets of variable length in the pellet press. The feed mixture is prepared by mixing the enzyme with desired feed components. The mixture is led to a conditioner e.g. a cascade mixer with steam injection.

Before the steam conditioning, the water content is typically 8-16% w/w, particularly 12-16% w/w.

During the conditioning step (before pelleting) the process temperature may rise above 60° C., 70° C., 80° C., 90° C. or 100° C. by injecting steam, measured at the outlet of the conditioner. The residence time can be variable from seconds to minutes and even hours, such as at least 5 seconds, 10 seconds, 15 seconds, 30 seconds, 1 minute, 2 minutes, 5 minutes, 10 minutes, 15 minutes, 30 minutes or 1 hour.

After the conditioning (before pelleting), the feed mixture has a water content (moisture content) below 20% w/w, particularly below 19% w/w or below 18%, e.g. 11-19% w/w or 15-18% w/w. The feed mixture after conditioning (before pelleting) typically has a water content (moisture content) above 15%, particularly above 16% or above 17% w/w. The water content may be determined as weight loss after drying for 16 hours at 103° C., The amount of steam added in the conditioning step may be above 3% w/w, particularly above 3.5%, and it is typically below 4.5% w/w, particularly below 4%. The residence time during conditioning and pelleting may be below 15 seconds, particularly below 10 seconds.

Pressing (Pelleting)

From the conditioner the feed mixture is led to a pellet press, where pellets are formed by pressing the feed mixture through holes in a die, and cutting. Examples of equipment are a Simon Heesen press and a Matador press. After the press the pellets typically have a temperature above 70° C., above 75° C. or above 80° C. The temperature after pelleting is typically below 105° C., below 100° C., below 95° C., below 90° C. or below 85° C., and the temperature of the mixture of feed components generally remains below this limit throughout the manufacturing process. The pellets are placed in an air cooler and cooled for a specified time e.g. 15 minutes.

In the process of the invention, the addition of alpha-amylase leads to a reduction of power consumption (determined as kWh input) in the pellet press, compared to a process without the alpha-amylase. The energy consumption in the process without the alpha-amylase is typically 10-20 kWh/ton, particularly 12-18 kWh/ton.

A reduction of electricity consumption can lead to a higher capacity if the pellet mill is already running at maximum load and therefore limits the feed processing as the throughput can be increased using the same energy. An increased throughput can decrease the idle energy and the man hours used to make the same amount of feed. Alternatively it is possible to produce more feed in the same time.

Optional Second Enzyme

Optionally, the feed composition one or more enzymes in addition to the alpha-amylase, particularly feed enzymes which improve the digestibility of the feed, e.g. a second amylase or a protease, aminopeptidase, carbohydrase, carboxypeptidase, catalase, cellulase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, mannosidase, oxidase, pectinolytic enzyme, peptidoglutaminase, peroxidase, phytase, polyphenoloxidase, proteolytic enzyme, ribonuclease, transglutaminase, or xylanase. The feed enzyme(s) may be derived from microorganisms such as bacteria or fungi or from plants or animals. The compositions may be prepared in accordance with methods known in the art.

The second enzyme may be provided in the form of a granulate, particularly a coated granulate, e.g. with a coating comprising a salt, e.g. at least 60% w/w of the salt. The salt coating may be as described in EP 1804592. Thus, the salt may be selected from the group consisting of NaCl, $Na_2CO_3$, $NaNO_3$, $Na_2HPO_4$, $Na_3PO_4$, $NH_4Cl$, $(NH_4)_2HPO_4$, $NH_4H_2PO_4$, $(NH_4)_2SO_4$, KCl, $K_2HPO_4$, $KH_2PO_4$, $KNO_3$, $Na_2SO_4$, $K_2SO_4$, $KHSO_4$, $MgSO_4$, $ZnSO_4$, $CuSO_4$ and sodium citrate.

EXAMPLES

Example 1: Manufacture of Steam-pelleted Feed

Two bacterial alpha-amylases derived from *Bacillus* were tested: BAN 480L and Liquozyme SC DS (Termamyl SC). BAN is an alpha-amylase derived from a strain of *B. amyloliquefaciens*. Termamyl SC DS is a variant of the native alpha-amylase derived from *B. licheniformis*; it is known to be more thermostable than BAN.

Alpha-amylase Thermostability

Samples of BAN 480L were subjected to thermal shift assay (TSA): 10 µl sample aliquots adjusted to 0.3 mg/ml concentration were mixed with 10 µl MES buffer (200 mM MES, 1 mM CaCl2, pH 6) and 10 µl Sypro Orange dye (S6650, Invitrogen, 100-fold diluted in 200 mM MES, 1 mM CaCl2, pH 6) in wells of LightCycler 480 Multiwell plate 96, white (Roche) and sealed with LightCycler 480 Sealing foil. The samples were subjected to a 25-96 C heating profile at 16 acquisitions/C (corresponding to approx. 200 C/h) on a LightCycler 480 II (Roche). Calculations of Tm were carried out via "LightCycler 480 Protein Melting" software (Roche). Double determinations of each sample was run, and the results are given as the average of these two determination.

The melting point was found to be 80.9° C.

Recipes of Feed Mixtures

The recipe of the feed composition was as follows:

Barley (55.0%), Wheat (19.3%), Soybean meal (16.4%), Oats (5.0%), Limestone (1.3%), Monocalcium phosphate (0.5%), Salt (0.5%), Vegetable Oil (0.5%), Minors (0.2%)

Enzyme Dosage:

The alpha-amylase was added in one of the early mixing steps (horizontal mixer) to allow as much reaction time as possible. Each enzyme was added at dosages indicated below and water was added to make sure that the same amount of liquid was added in all trials. One control trial was carried out with only water added.

6 kg of liquid (enzyme and water) was added for each ton of feed mixture. For the control, 6 kg of water was added per ton to the feed mixture.

Process

All feed components were pre manufactured and stored in big bags. The feed was milled on a 3.5 mm screen in a Champion mill running 2975 rpm. The ground feed was mixed in a horizontal mixer for 10 minutes.

Before pelleting the big bags containing the feed mixture were emptied out in the horizontal mixer and enzyme/water was sprayed on to the feed. The feed mixture was mixed for 10 minutes. From the mixer the feed mixture was transported by an elevator and a screw conveyer to the pellet press raw material pre-bin.

From the pre-bin, the mixture was dosed into the cascade mixer by a dosing screw, with a setting of 27%, keeping a constant capacity of 3.0 ton/h. Retention time in the cascade mixer was 30-40 sec. The feed temperature was set to be 73-74° C., which is the temperature needed to reach a pellet temperature of 83-84° C. To adjust the feed mixture temperature steam was added to the feed in the cascade mixer. The steam was adjusted based on the temperature measured with a pt 100 sensor. The steam % was calculated as: (The feed mixture temperature, out–feed mixture temperature, cold meal)/14 (1% steam raises the temperature by 14° C.).

For each test the quantity of steam was calculated. The moisture content of the feed before pelleting (after cascade mixer) was determined by drying at 103° C. for 16 hours. Retention time in the pellet press was approx. 5 seconds.

All trials were carried out on a pellet mill with Ø4×60 mm die. The electricity consumption of the Pellet press motor was measured with an electrical kWh-meter, which was reset when the process parameters were stable. In all trials the reset of the Kwh-meter was done after five minutes of run time. During the pelleting the capacity was measured by collecting pellets from the press during a defined time span. The capacity was calculated based on the weight of the pellets and the time consumed. Immediately after the pellet press, a sample of the hot pellets was collected. The temperature of the hot pellets was measured manually with a pt 100 sensor.

All process data from the production and pelletizing in a test series are automatically registered on PC during the process. During the run capacity, meal temperature, pellet temperature, where measured/registered at start up, 500 kg (k1), 1000, kg (k2) and 1500 kg (k3).

After the pellet press the pellets were transferred by a conveyer belt and an elevator to an ANDRITZ feed and Biofuel countercurrent cooler. The cooler has a capacity of 1200 kg. When it is full horizontal sweeping will progress automatically through the rest of the trial. When the experiment was over 800 kg had been swept. The remaining 1200 kg were kept in the cooler for 15 minutes more before the final sweep was started. The cooling air used was ambient temperature. All samples were collected after the cooler.

Results

The results showed the effect of amylase treatment on energy consumption (specific energy and reduction in energy) as follows:

| Alpha-amylase | Dosage (mg enzyme protein per kg feed) | Moisture in feed mixture after steam treatment, before pelleting (%) | Pellet temperature after pressing (° C.) | Specific energy consumption (kWh/ton) | Relative energy (%) | Energy reduction (%) |
|---|---|---|---|---|---|---|
| Control | 0 | 17.6 | 83.5 | 15.3 | 100 | — |
| BAN 480L | 11.2 | 17.6 | 83.5 | 14.2 | 92.8 | 7.2 |
|  | 22.3 | 17.4 | 83.5 | 13.8 | 90.2 | 9.8 |
| Liquozyme SC DS (Termamyl SC) | 2.8 | 17.5 | 83 | 14.6 | 95.4 | 4.6 |
|  | 11.2 | 17.6 | 83.5 | 14.0 | 91.5 | 8.5 |
|  | 22.3 | 17.6 | 83.5 | 13.8 | 90.2 | 9.8 |

Discussion

The feed temperature set-point was based on experience of temperature before and after pelleting. It was intended to reach a pellet temperature on 81° C. as regulated by law. The pellet temperature was between 82 and 84° C. in the six trials.

Analyses showed that the cooled pellets had a moisture content of 14% in all trials and no significant variation was seen. The dust in produced pellets and durability was determined, and no significant difference was seen.

The energy consumption was measured with at kW meter. In the control 15.3 Kwh/ton was used. For BAN and Liquozyme SC DS, there was a reduction in energy consumption ranging between 5 and 10%. The highest reduction was obtained with the highest dosage of BAN 480 L and Liquozyme SC DS, respectively.

The invention claimed is:

1. A process for manufacturing a pelleted feed composition comprising the steps of:
    a) mixing feed components comprising starch with an alpha-amylase to form a mixture which has a water content of 8-16% w/w,
    b) steam treating the mixture to form a steam treated mixture which has a water content below 20% by weight, and
    c) pressing the steam treated mixture to form pellets resulting in little or no gelatinization of the starch in pellets,
at conditions to reduce energy consumption in step (c) compared to a process without the alpha-amylase.

2. The process of claim 1, wherein the alpha-amylase is included in the mixture in liquid or powder form.

3. The process of claim 1, wherein the alpha-amylase is derived from bacteria.

4. The process of claim 1, wherein the alpha-amylase has a melting point above 75° C.

5. The process of claim 1, wherein the alpha-amylase is included in the mixture in an amount of at least 2 g enzyme protein per ton of feed component.

6. The process of claim 1, wherein the temperature after pelleting of the steam treated mixture is above 75° C.

7. The process of claim 1, wherein the temperature of the feed mixture remains below 105° C.

8. The process of claim 1, wherein the mixture before step (b) has a water content of 12-16% w/w.

9. The process of claim 1, wherein the steam treated mixture after step (b) has a water content below 19% w/w.

10. The process of claim 1, wherein steps b) and c) are performed for a total residence time of less than 15 seconds.

11. The process of claim 1, wherein the mixture further includes a second enzyme in the form of granules.

12. The process of claim 1, wherein the granules have a coating comprising a salt.

13. The process of claim 12, wherein the coating comprises at least 60% (w/w) of the salt.

14. The process of claim 12, wherein the salt in the coating is selected from the group consisting of NaCl, $Na_2CO_3$, $NaNO_3$, $Na_2HPO_4$, $Na_3PO_4$, $NH_4Cl$, $(NH_4)_2HPO_4$, $NH_4H_2PO_4$, $(NH_4)_2SO_4$, KCl, $K_2HPO_4$, $KH_2PO_4$, KNOB, $Na_2SO_4$, $K_2SO_4$, $KHSO_4$, $MgSO_4$, $ZnSO_4$, $CuSO_4$ and sodium citrate.

15. The process of claim 11, wherein the second enzyme has amylase, protease, phytase, xylanase, beta-glucanase, pectinase, cellulase and/or lipase activity.

16. The process of claim 9, wherein the steam treated mixture after step (b) has a water content of 11-19% w/w.

17. The process of claim 9, wherein the steam treated mixture after step (b) has a water content of 15-18% w/w.

* * * * *

UNITED STATES PATENT AND TRADEMARK OFFICE
CERTIFICATE OF CORRECTION

PATENT NO. : 10,617,135 B2
APPLICATION NO. : 14/900765
DATED : April 14, 2020
INVENTOR(S) : Joergensen et al.

Page 1 of 1

It is certified that error appears in the above-identified patent and that said Letters Patent is hereby corrected as shown below:

In the Claims

Column 6, In Claim 12, Line 1, delete "claim 1" and insert --claim 11--.

Column 6, In Claim 14, Line 5, delete "KNOB" and insert --$KNO_3$--.

Signed and Sealed this
Twenty-fourth Day of November, 2020

Andrei Iancu
*Director of the United States Patent and Trademark Office*